United States Patent [19]

Manoogian

[11] Patent Number: 4,990,919
[45] Date of Patent: Feb. 5, 1991

[54] MISSILE DECOY SYSTEM

[75] Inventor: David V. Manoogian, Lynnfield, Mass.

[73] Assignee: Raytheon Company, Lexington, Mass.

[21] Appl. No.: 425,259

[22] Filed: Oct. 23, 1989

[51] Int. Cl.$^5$ .......................... H04K 3/00; G01S 7/38
[52] U.S. Cl. ......................................... 342/13; 342/14
[58] Field of Search ................................... 342/13-21

[56]  References Cited
U.S. PATENT DOCUMENTS

| | | | |
|---|---|---|---|
| 2,931,031 | 3/1960 | Deloraine et al. | 342/15 |
| 3,600,685 | 8/1971 | Doyle | 455/1 |
| 3,624,652 | 11/1971 | Haeff | 342/14 |
| 3,670,333 | 6/1972 | Winn | 342/14 |
| 3,879,732 | 4/1975 | Simpson | 342/14 |
| 3,905,035 | 9/1975 | Krumboltz et al. | 342/14 |
| 4,097,865 | 6/1978 | Jones | 342/14 X |
| 4,149,167 | 4/1979 | Peters, Jr. et al. | 354/14 |
| 4,173,760 | 11/1979 | Garrison | 342/465 |
| 4,347,513 | 8/1982 | Schindler | 342/13 |
| 4,433,333 | 2/1984 | Manoogian et al. | 342/14 |
| 4,456,912 | 6/1984 | Ensley | 342/13 |
| 4,546,356 | 10/1985 | Petitjean et al. | 342/16 |

Primary Examiner—Thomas H. Tarcza
Assistant Examiner—John B. Sotomayor
Attorney, Agent, or Firm—Donald F. Mofford; Richard M. Sharkansky

[57]                ABSTRACT

A radar system, including a pulse radar capable of emitting interrogating pulses and high rate antiradition missile decoys, is shown to comprise a plurality of decoys adapted to emit pulses having duty factors less than the duty factor of the interrogating pulses, but when activated successively form a changing composite covering pulse for overlapping an emitted interrogating pulse, thereby preventing an anti-radiation missile from destroying the radar system.

2 Claims, 2 Drawing Sheets

MISSILE DECOY SYSTEM

BACKGROUND OF THE INVENTION

This invention pertains generally to radar systems, and particularly to any type of such systems that uses high data rate anti-radiation missile decoys.

It is well known in the art that an anti-radiation missile (ARM) is adapted to home on radio frequency (R.F.) signals radiated so that an explosive charge carried by such a missile may destroy a radar. To accomplish such homing, the guidance system in an ARM missile may be designed to lock onto the leading or trailing edge of radar interrogating pulses, as well as midpulse samples of such pulses. It is therefore desirable that, in order to increase the chance of survivability of a radar attacked by an ARM missile, decoys located in the vicinity of the radar be actuated to generate R.F. signals to cause the guidance system in an attacking ARM missile to home on an apparent source spaced from the radar. Thus, R.F. signals from the decoys are synchronized with the interrogating signals from the radar so that the R.F. signals from the decoys produce pulses overlapping (in power and time) the interrogating pulses produced by sidelobes of the antenna in the radar. Consequently, the guidance system in an attacking ARM missile is precluded from using the leading or trailing edges or midpulse samples of the interrogating pulses to derive guidance commands. Further, the decoys are caused to "blink". That is to say, only one of the decoys is allowed to be operative to overlap a given interrogating pulse. As a result of such "blinking" the aim point of the ARM is caused to wander, thereby preventing the ARM from homing on the radar or any one of the decoys.

A decoy capable of producing overlapping pulses with sufficiently high power levels usually comprises a master oscillator-power amplifier configuration wherein a traveling wave tube (TWT) chain is driven by a frequency agile exciter. While such a configuration may be operable with a relatively high duty cycle, there are several deficiencies that make use of such a decoy unattractive. Firstly, the physical size of TWT is large for the purpose, and cooling means are required. Further, a high voltage power supply that is quite complex is required because a grid modulator, a tube body supply and one or more depressed collector supplies must be provided. Hence, a simpler and less expensive alternative approach is desirable.

A magnetron oscillator as an R.F. energy source is less expensive than a TWT in a master oscillator-power amplifier configuration for a decoy. However, any known type of magnetron oscillator, although capable of producing covering pulses with the requisite peak power levels, is presently limited to relatively low duty cycles, i.e., a maximum of one percent. Therefore, if the duty cycle of interrogating pulses transmitted from a radar is greater than one percent, a magnetron oscillator cannot, by itself, produce covering pulses having a length sufficiently long to mask the interrogating pulses.

SUMMARY OF THE INVENTION

With the foregoing background of this invention in mind, it is a primary object of this invention to provide a decoy system producing emissions that fully cover (in time and amplitude) interrogating pulses from a radar to be protected against attack by an ARM.

Another object of this invention is to provide a decoy system wherein individual decoys are protected against an attack by an anti-radiation missile.

Still another object of this invention is to provide an inexpensive anti-radiation missile decoy system.

The following and other objects of this invention are met generally by a method utilizing a plurality of decoys, each one of such decoys being synchronized to produce composite covering pulses to prevent a guidance system carried by an attacking ARM from providing homing signals to direct the ARM to either the radar sought to be protected or any one of the decoys. The method includes the step of changing, relative to the time each interrogating pulse is transmitted, the time at which R.F. pulses are emitted from the decoys. Such changing, or "blinking," causes the ARM aim point to wander because the guidance system on the ARM is caused to home on different decoys (but never on the radar sought to be protected) at different times during an attack. Thus, during the terminal stage of an attack by an ARM, the guidance system on the ARM produces progressively greater and greater error signals until the dynamic response of such guidance system is exceeded, with the result that proper homing signals on any decoy cannot be generated.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Figure 1:
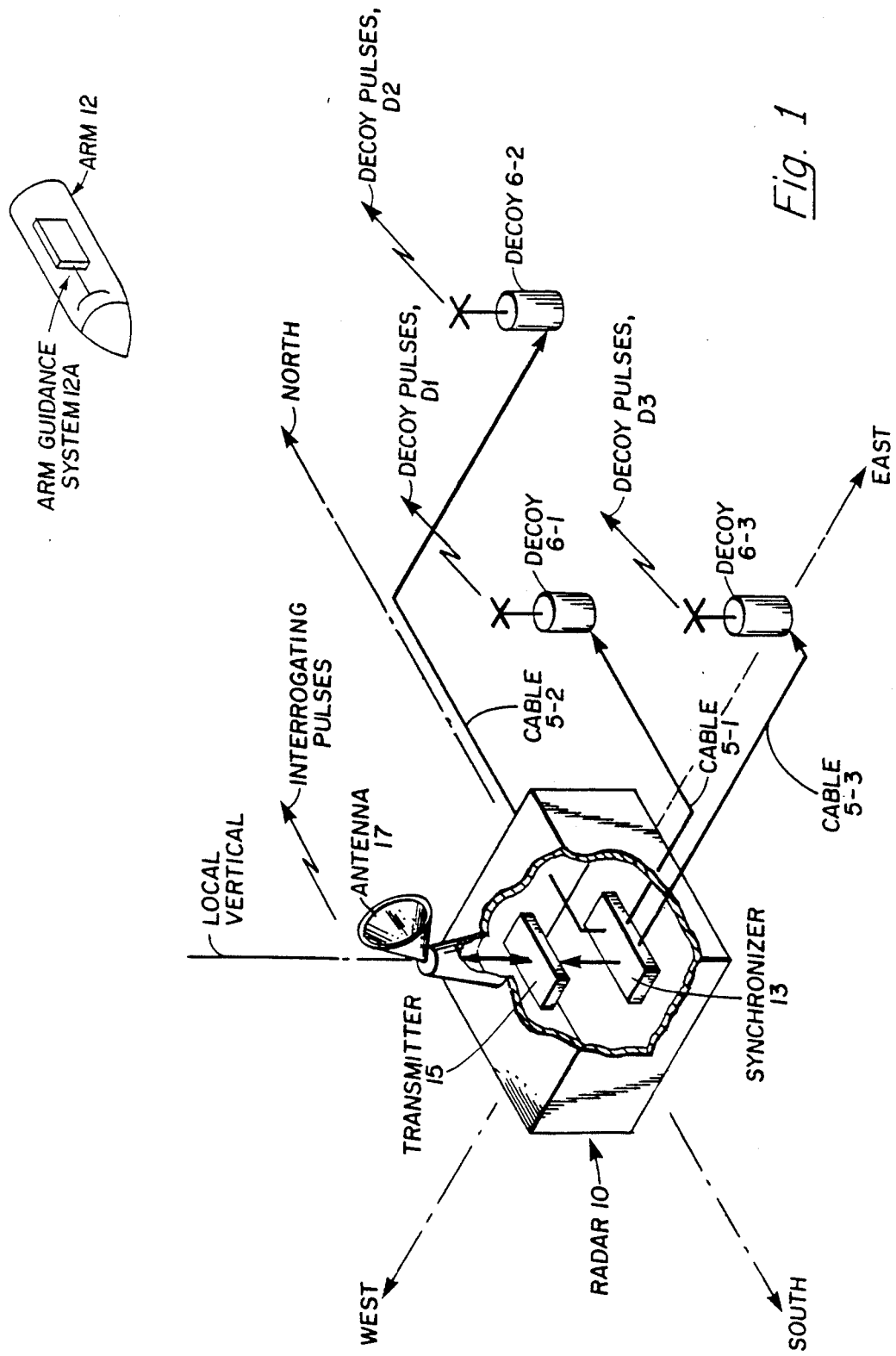
FIG. 1 is a sketch illustrating a preferred way in which a radar and decoys may be interconnected in accordance with this invention.
Figure 2:
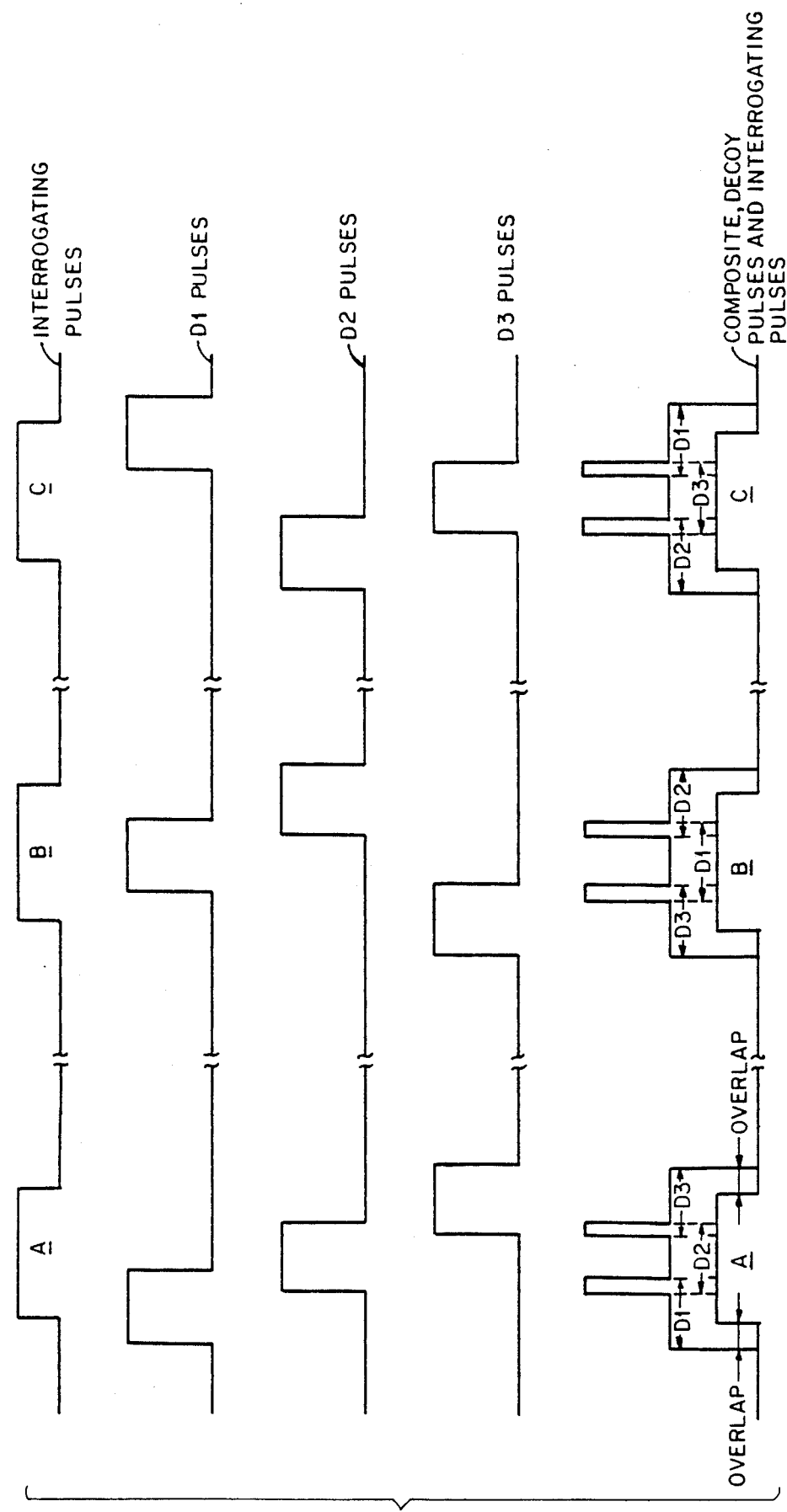
FIG. 2 is a sketch illustrating how preferred sequences for emission of pulses from each one of the decoys in FIG. 1 may be accomplished in accordance with this invention.

It may be seen in FIG. 1 that a plurality of decoys (not numbered), here three decoys 6-1, 6-2, 6-3, is placed at separate locations in the vicinity of a radar 10. Each one of the decoys 6-1, 6-2, 6-3 is linked to the radar 10 through a data link, here cables 5-1, 5-2, 5-3. The radar 10 here is a conventional pulse radar emitting interrogating pulses with a predetermined frequency to illuminate an ARM 12 homing on the radar 10. A synchronizer 13 in the radar 10 is arranged to control a transmitter 15, thereby producing interrogating pulses emitted by an antenna 17. Here the duty factor of the transmitter 15 is in the order of three percent, although other duty factors may be used. The synchronizer 13 is also arranged to produce control signals for the decoys 6-1, 6-2, 6-3 so that decoy pulses (having predetermined frequency) and interrogating pulses here are produced in the orders as shown in FIG. 2. Each one of the decoys 6-1, 6-2, 6-3 has a duty factor substantially less than the duty factor of the transmitter 15.

It will be appreciated that a guidance system 12A in the ARM 12 comprises known circuitry to produce guidance commands that cause the ARM 12 to home on a source of R.F. signals. Thus, if only the radar 10 were radiating R.F. signals in the form of interrogating pulses, the guidance system 12A would respond to a preselected portion, i.e., the leading edge, the trailing edge or a midpulse sample of each successive one of the interrogating pulses, ultimately to generate guidance commands whereby the ARM 12 is caused to home on the radar 10. Here, however, the synchronizer 13 is arranged to provide trigger pulses (not shown) to the transmitter 15 and to each one of the decoys 6-1, 6-2, 6-3. The sequence of the trigger pulses is as shown by the leading edge of the upper four curves in FIG. 2. That is to say, if it be assumed that a trigger pulse is coincident with the leading edge of each interrogating pulse as well as with the leading edge of each decoy pulse, the synchronizer 13 here is arranged to produce trigger pulses as shown in TABLE 1.

TABLE 1

| INTERRO-GATING PULSE | PRETRIGGER | MIDPULSE TRIGGER | TRAILING TRIGGER |
|---|---|---|---|
| A | 6-1 | 6-2 | 6-3 |
| B | 6-3 | 6-1 | 6-2 |
| C | 6-2 | 6-3 | 6-1 |

"PRETRIGGER" means a trigger pulse occurring before the trigger pulse for an interrogating pulse; "MIDPULSE TRIGGER" means a trigger pulse occurring during transmission of an interrogating pulse; and "TRAILING TRIGGER" means a trigger pulse occurring just before the trailing edge of an interrogating pulse. It will be appreciated that conventional logic circuitry embedded in the synchronizer 13 (which circuitry need not be shown to enable a person of skill in the art to practice this invention) may be employed so that the trigger pulses for each successively occurring triad A, B, C, of interrogating pulses are generated as set forth in TABLE 1 and shown in FIG. 2.

The composite covering pulses and interrogating pulses for an exemplary triad A, B, C of interrogating pulses are shown in the curve just at the bottom of FIG. 2. Inspection of the curve just referred to demonstrates that: (a) each composite covering pulse overlaps the corresponding interrogating pulse; (b) the amplitude of the composite covering pulse is always greater than the amplitude of the corresponding interrogating pulse; and (c) each composite covering pulse in each triad A, B, C differs from the other two composite decoy pulses.

The radar 10 may, for example, utilize a TWT chain to produce interrogating pulses that are 10 microseconds in duration, at a pulse repetition interval of 400 microseconds. Each decoy 6-1, 6-2, 6-3 may utilize a magnetron to produce pulses 4 microseconds in duration.

It will be observed that the difference between the propagation delay of each interrogating pulse and the corresponding decoy pulses is dependent upon the elevation angle and the azimuth angle of the ARM 12 with respect to the radar 10 and the decoys 6-1, 6-2, 6-3. However, (even if the time of occurrence of the various trigger pulses is not adjusted), so long as the decoys 6-1, 6-2, 6-3 are relatively close to the radar 10, any possible change in the difference between propagation times would be less than the overlap between each interrogating pulse and the pulses from any decoy. It follows then that, regardless of the direction from which the ARM 12 approaches the radar 10, all interrogating pulses received by the ARM guidance system 12A are masked by composite covering pulses. Further, whether the ARM guidance system 12A is arranged to track on either the leading or trailing edge of received pulses, only pulses D1, D2, D3 would be processed by the ARM guidance system 12A (FIG. 1). To put it another way, were a leading edge or a trailing edge tracker (not shown) used on the ARM 12 (FIG. 1), the derived guidance commands would direct the ARM 12 (FIG. 1) to an impact point on the terrain at some distance away from the radar 10 (FIG. 1). The impact point further would not be coincident with the location of any of the decoys 6-1, 6-2, 6-3 (FIG. 1) for the reason that dynamic response of the guidance system 12A in the ARM 12 (FIG. 1) would, in the terminal phase of an attack, be exceeded.

Even if the ARM guidance system 12A (FIG. 1) were to be arranged to process mid-pulse samples, the impact point of the ARM 12 (FIG. 1) would be at some distance from the radar 10 (FIG. 1) and any one of the decoys 6-1, 6-2, 6-3. As illustrated in FIG. 2, the composite decoy pulses as received by the ARM guidance system (FIG. 1) are: (a) always greater than the interrogating pulses from the sidelobes of the radar antenna; and (b) the apparent origin of mid-pulse samples of the composite decoy pulses changes from pulse to received pulse. The combination of the two just-mentioned conditions prevents the generation of guidance commands for the ARM 12 (FIG. 1) to cause the ARM 12 (FIG. 1) to home on either the radar 10 (FIG. 1) or any single one of the decoys 6-1, 6-2, 6-3 (FIG. 1).

Having described a preferred embodiment of this invention, it will now be apparent to one of skill in the art that changes may be made without departing from the inventive concepts. Thus, it is obvious that the number of decoys may be increased with a concomitant increase in effectiveness of deception with less expensive decoys. Further, it will be evident that conventional frequency controlling means could be added in the disclosed system so that the frequency of signals emitted by each decoy is forced to be substantially the same as the frequency of each interrogating signal from the radar. In view of the foregoing it is felt that this invention should not be restricted to the disclosed embodiment, but rather should be limited only by the spirit and scope of the appended claims.

What is claimed is:

1. A method of protecting a pulse radar from an ARM missile attempting to home on interrogating pulses emitted by such radar, the duty factor and amplitudes of the interrogating pulses being known, such method comprising the steps of:
  (a) siting a plurality of decoys at different locations in the vicinity of the pulse radar, each one of the decoys being adapted, when actuated, to emit pulses having duty factors less than the duty factor of the interrogating pulses and amplitudes normally greater than the amplitudes of the interrogating pulses;
  (b) sequentially actuating, when each one of the interrogating pulses is generated in the pulse radar, a selected set of decoys in the plurality of decoys to form a composite covering pulse overlapping the then emitted one of the interrogating pulses; and
  (c) changing, at the time each successive one of the interrogating pulses is generated, the sequence in which the decoys in each selected set are actuated, thereby to change the composite covering pulse overlapping each one of the successively emitted interrogating pulses.

2. The method as in claim 1 wherein the number of decoys in the selected set equals the number of decoys in the plurality of decoys.

* * * * *